United States Patent
Kouno et al.

(10) Patent No.: US 12,374,997 B2
(45) Date of Patent: Jul. 29, 2025

(54) ELECTRIC POWER CONVERSION DEVICE AND CONTROL METHOD OF ELECTRIC POWER CONVERSION DEVICE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yuusuke Kouno, Tokyo (JP); Toshiyuki Baba, Kawaguchi Saitama (JP); Yasuomi Maki, Tokyo (JP); Yuichiro Nozaki, Tokyo (JP); Tsunehito Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 236 days.

(21) Appl. No.: 18/248,673

(22) PCT Filed: Oct. 7, 2021

(86) PCT No.: PCT/JP2021/037220
§ 371 (c)(1),
(2) Date: Apr. 11, 2023

(87) PCT Pub. No.: WO2022/080237
PCT Pub. Date: Apr. 21, 2022

(65) Prior Publication Data
US 2023/0396169 A1    Dec. 7, 2023

(30) Foreign Application Priority Data
Oct. 13, 2020   (JP) ................. 2020-172778

(51) Int. Cl.
*H02M 3/28*     (2006.01)
*H02M 1/14*     (2006.01)
*H02M 5/458*    (2006.01)

(52) U.S. Cl.
CPC ............. *H02M 3/285* (2013.01); *H02M 1/14* (2013.01); *H02M 5/458* (2013.01)

(58) Field of Classification Search
CPC ........... H02M 3/33573; H02M 7/5387; H02M 3/33571; H02M 3/01; H02M 7/4815
See application file for complete search history.

(56) References Cited

U.S. PATENT DOCUMENTS

RE44,485 E  *  9/2013  Falk .................. H02M 3/33573
                                                   363/21.02
2017/0025963 A1  1/2017  Otake et al.
(Continued)

FOREIGN PATENT DOCUMENTS

JP    2001-78449 A    3/2001
JP    2016-1980 A     1/2016
(Continued)

OTHER PUBLICATIONS

Japanese Patent Office, Office Action in JP App. No. 2020-172778, 2 pages, with machine translation, 4 pages (Jun. 18, 2024).

*Primary Examiner* — Said Bouziane
(74) *Attorney, Agent, or Firm* — Finnegan, Henderson, Farabow, Garrett & Dunner, LLP

(57) ABSTRACT

In an electric power conversion device according to an embodiment, a chopper converts electric power from a power supply into direct-current power. An inverter converts the direct-current power into alternating-current power. Pairs of resonant capacitors are connected to a direct-current input section of the inverter. Each of the pairs is in series. Primary windings of high-frequency transformers are connected to the inverter and respective midpoints of the pairs of resonant capacitors. The high-frequency transformers convert the alternating-current power of the inverter. Rectifiers convert alternating-current power supplied from secondary windings of the high-frequency transformers into (Continued)

direct-current power. One or more voltage detectors detect output voltage of one or more of the rectifiers. A control device controls the chopper on the basis of output of the voltage detectors such that an output voltage of the direct-current power comes to a predetermined voltage value.

7 Claims, 13 Drawing Sheets

(56) References Cited

U.S. PATENT DOCUMENTS

| | | |
|---|---|---|
| 2019/0131874 A1 | 5/2019 | Saga |
| 2020/0244187 A1 | 7/2020 | Shirasawa et al. |

FOREIGN PATENT DOCUMENTS

| | | |
|---|---|---|
| JP | 2019-83658 A | 5/2019 |
| JP | 2019-88043 A | 6/2019 |
| JP | 6569839 B1 | 9/2019 |

\* cited by examiner

ELECTRIC POWER CONVERSION DEVICE AND CONTROL METHOD OF ELECTRIC POWER CONVERSION DEVICE

CROSS-REFERENCE TO RELATED APPLICATIONS

This application is national stage application of International Application No. PCT/JP2021/037220, filed Oct. 7, 2021, which designates the United States, incorporated herein by reference, and which claims the benefit of priority from Japanese Patent Application No. 2020-172778, filed Oct. 13, 2020, the entire contents of which are incorporated herein by reference.

FIELD

Embodiments of the present invention relate to an electric power conversion device and a control method of an electric power conversion device.

BACKGROUND

When electric power is supplied from a high-voltage voltage system to a low-voltage load, not only conversion of a voltage value but also isolation by a transformer (isolation transformer) is required. In the electric power conversion device using the isolation transformer, direct-current power is converted into alternating-current power, and the alternating-current power is input to a primary side of the isolation transformer. Then, an output on the secondary side is rectified to convert back into direct-current power. As the alternating-current power input to the isolation transformer is increased in frequency, the isolation transformer can be downsized, and the system can be downsized.

One configuration of a high-frequency isolation type electric power conversion device includes a chopper that converts electric power supplied from a power supply circuit into desired direct-current power, an inverter that converts the direct-current power of the chopper into high-frequency alternating-current power, a high-frequency transformer (isolation transformer) that is excited by high-frequency alternating current supplied from the inverter, and a rectifier that converts high-frequency alternating-current power into direct-current power. In addition, by applying a resonance circuit using the resonance operation between the capacitance and the inductance on the circuit, the switching loss of the inverter can be greatly reduced, and the high-frequency switching of the inverter can be performed.

DETAILED DESCRIPTION

An electric power conversion device according to an embodiment includes a chopper, an inverter, pairs of resonant capacitors, high-frequency transformers, rectifiers, one or more voltage detectors, and a control device. The chopper is configured to convert electric power from a power supply into direct-current power and output the direct-current power. The inverter is configured to convert the direct-current power output from the chopper into alternating-current power. The pairs of resonant capacitors are connected to a direct-current input section of the inverter. Each of the pairs is in series. The high-frequency transformers are high-frequency transformers whose primary windings are connected to the inverter and respective midpoints of the pairs of resonant capacitors. The high-frequency transformers are configured to convert the alternating-current power of the inverter. The rectifiers are configured to convert alternating-current power supplied from secondary windings of the high-frequency transformers into direct-current power. The one or more voltage detectors are configured to detect output voltage of one or more of the rectifiers. The control device is configured to control the chopper on the basis of output of the one or more voltage detectors such that an output voltage of the direct-current power comes to a predetermined voltage value.

Hereinafter, embodiments will be described with reference to the drawings.

(1) First Embodiment

Figure 1:
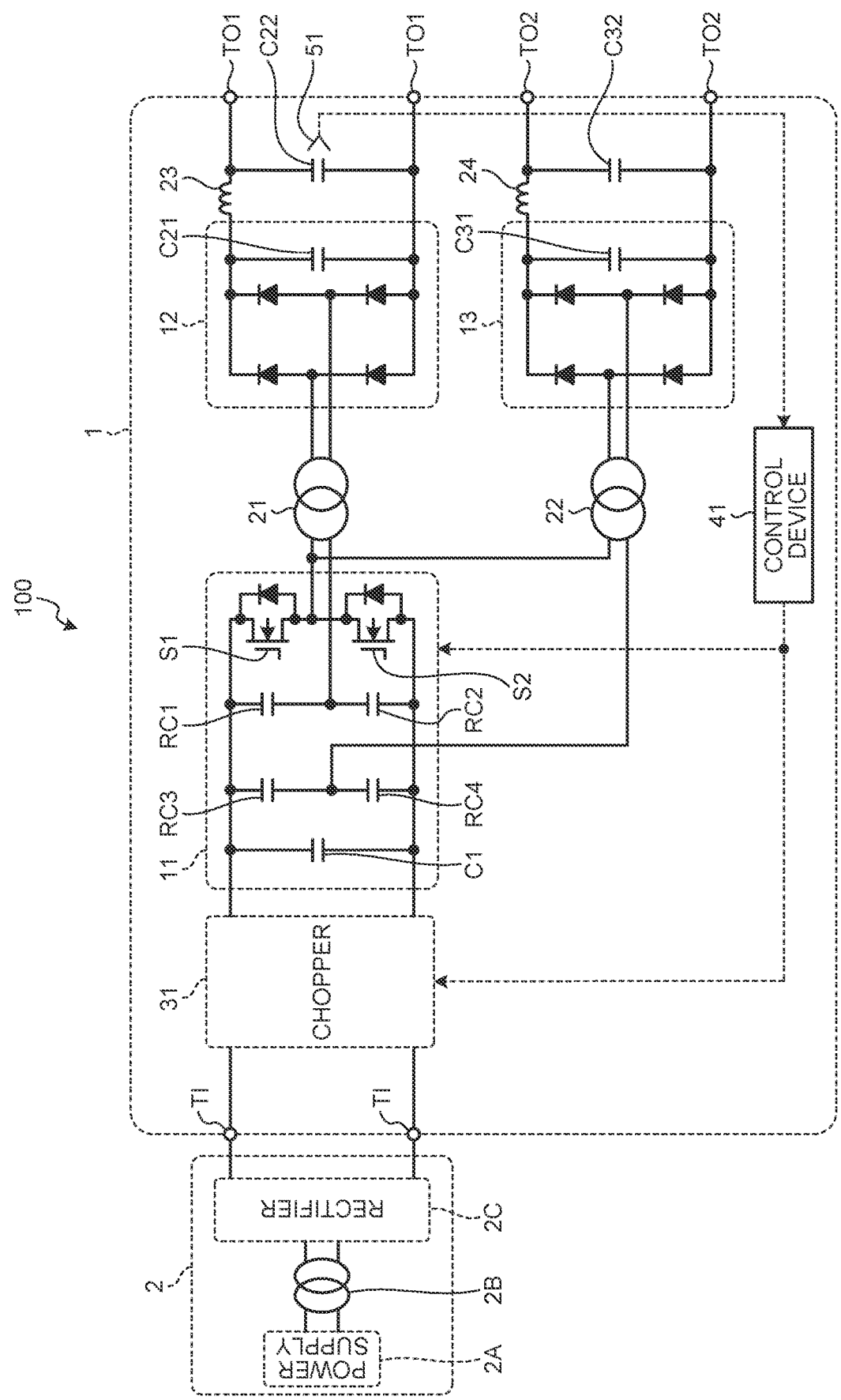
FIG. 1 is a schematic configuration explanatory diagram of an electric power conversion device according to a first embodiment.

FIG. 1 is a schematic configuration explanatory diagram of an electric power conversion device according to the first embodiment.

In order to ensure isolation between the primary side and the secondary side, there is a known transformer that isolates the primary side and the secondary side by using a transformer including a pair of windings (coils) that are electromagnetically coupled.

An electric power conversion system 100 of the embodiment includes an electric power conversion device 1 having a transformer, and a power supply device 2.

By the way, the transformer becomes larger as the excitation frequency becomes lower. For example, a transformer with an excitation frequency corresponding to a frequency of 50 Hz or 60 Hz of a commercial power supply is large in size. Therefore, the electric power conversion device 1 of the present embodiment uses a high-frequency transformer as the transformer to isolate the primary side and the secondary side and achieves downsizing.

Here, the configuration of the electric power conversion device 1 will be described in detail.

The electric power conversion device 1 includes a resonant inverter 11, a first diode rectifier 12, a second diode rectifier 13, a first high-frequency transformer 21, a second high-frequency transformer 22, a chopper 31, an input terminal TI of an input system of the electric power conversion device 1, an output terminal TO1 of a first output system of the electric power conversion device 1, an output terminal TO2 of a second output system of the electric power conversion device 1, a voltage detector 51 that detects a voltage of the output terminal TO1, and a control device 41 that receives a voltage detection signal DS51 of the voltage detector 51 and controls the resonant inverter 11 and the chopper 31.

The input terminal TI of the electric power conversion device 1 is connected to the power supply circuit 2 that is provided with a power supply 2A, a transformer 2B, and a rectifier 2C.

Here, in a case where the rectifier 2C is configured as a diode bridge, the voltage of the input terminal TI fluctuates. Therefore, the voltage fluctuation is suppressed by converting the electric power input from the power supply circuit 2 into direct-current power of a predetermined voltage by the chopper 31 and outputting the direct-current power to the resonant inverter 11.

The resonant inverter 11 supplies alternating-current power to the first high-frequency transformer 21 and the second high-frequency transformer 22 by using the direct-current power supplied from the chopper 31. The resonant inverter 11 is configured as, for example, a resonant type single-phase half-bridge inverter.

The resonant inverter 11 includes a filter capacitor C1, a first switching transistor S1, a second switching transistor S2, a first resonant capacitor RC1, a second resonant capacitor RC2, a third resonant capacitor RC3, and a fourth resonant capacitor RC4.

A primary winding of the first high-frequency transformer 21 is connected to a midpoint of the first switching transistor S1 and the second switching transistor S2. The primary winding of the first high-frequency transformer 21 is connected to a midpoint of the first resonant capacitor RC1 and the second resonant capacitor RC2, which are in series.

Then, the resonant inverter 11 supplies the alternating-current power to the first high-frequency transformer 21 by alternately turning on and off the first switching transistor S1 and the second switching transistor S2 under the control of the control device 41.

A primary winding of the second high-frequency transformer 22 is connected to the midpoint of the first switching transistor S1 and the second switching transistor S2. The primary winding of the second high-frequency transformer 22 is connected to a midpoint of the third resonant capacitor RC3 and the fourth resonant capacitor RC4, which are in series.

Then, the resonant inverter 11 supplies the alternating-current power to the second high-frequency transformer 22 by alternately turning on and off the switching transistor S1 and the second switching transistor S2 under the control of the control device 41.

In the following description, the first switching transistor S1 side of the resonant inverter 11 is referred to as an upper arm of the resonant inverter 11. In addition, the second switching transistor S2 side of the resonant inverter 11 is referred to as a lower arm of the resonant inverter 11.

The first high-frequency transformer 21 is configured as an isolation transformer that includes a primary-side winding (primary winding) for generating a magnetic flux and a secondary-side winding (secondary winding) that is isolated from the primary winding and excited by the magnetic flux generated in the primary winding.

In a case where an alternating current is supplied from the resonant inverter 11 to the primary winding of the first high-frequency transformer 21, a magnetic flux is generated in the primary winding. The magnetic flux generated in the primary winding causes an induced current in the secondary winding. Thus, the first high-frequency transformer 21 supplies electric power, which corresponds to the alternating current input from the primary side, to the secondary side.

The diode rectifier 12 is a circuit that rectifies the electric power generated in the secondary winding of the first high-frequency transformer 21. In FIG. 1, the diode rectifier 12 is provided with a diode bridge (rectifier bridge) formed by combining a plurality of diodes, and a filter capacitor C21. The filter capacitor C21 smooths the direct-current voltage rectified by the diode rectifier 12.

In addition, a reactor 23 smooths the direct current rectified by the diode rectifier 12.

A filter capacitor C22 stabilizes the voltage at the output terminal TO1.

The second high-frequency transformer 22 is an isolation transformer that includes a primary-side winding (primary winding) for generating a magnetic flux and a secondary-side winding (secondary winding) that is isolated from the primary winding and excited by the magnetic flux generated in the primary winding. In a case where an alternating current is supplied from the resonant inverter 11 to the primary winding of the second high-frequency transformer 22, a magnetic flux is generated in the primary winding. The magnetic flux generated in the primary winding causes an induced current in the secondary winding. Thus, the second high-frequency transformer 22 supplies electric power to the secondary side in accordance with the alternating current input from the primary side.

The diode rectifier 13 is a circuit that rectifies the electric power generated in the secondary winding of the second high-frequency transformer 22. The diode rectifier 13 is provided with, for example, a diode bridge (rectifier bridge) formed by combining a plurality of diodes, and a filter capacitor C31. The filter capacitor C31 smooths the direct-current voltage rectified by the diode rectifier 13.

In addition, a reactor 24 smooths the direct current rectified by the diode rectifier 13.

A filter capacitor C32 stabilizes the voltage of the output terminal TO2.

The direct-current power output from each of the output terminal TO1 and the output terminal TO2 directly supplies electric power to a direct-current load, or the voltage is converted by a converter such as an inverter, which is not illustrated, and the electric power is supplied to a load.

In this case, the voltage detector 51 detects the output voltage value of the output terminal TO1 and inputs the output voltage value to the control device 41 as the voltage detection signal DS51.

Then, the control device 41 controls the resonant inverter 11 and the chopper 31 on the basis of the voltage detection signal DS51.

In this case, the control device 41 is configured as, for example, a logic circuit that generates a pulse signal. Alternatively, it is also possible to adopt a configuration in which the control device 41 includes a microprocessor that is an arithmetic element (computer) for executing arithmetic processing, and a memory that stores a program, data used in the program, and the like, and the microprocessor executes the program to generate a pulse signal.

The control device 41 controls a conduction ratio of the chopper 31 such that the output voltage of the output terminal TO1 of the electric power conversion device 1 comes to a predetermined voltage value. In addition, in the present embodiment, the control device 41 performs control by setting the conduction ratio of the upper arm and the lower arm of the resonant inverter 11, that is, the ON-period of each arm to be constant.

In this case, the output voltage of the output terminal TO2 is not constant but does slightly fluctuate. However, in the system where the converter such as an inverter is connected to the output terminal TO2, there is no problem as long as the voltage fluctuation of the output voltage is within a controllable range.

In the above description, the output of the electric power conversion device 1 is two systems; however, similarly to the first resonant capacitor RC1 and the second resonant capacitor RC2, a pair of resonant capacitors connected in series in parallel with the filter capacitor C1 and a high-frequency transformer are provided, and thereby the same configuration can be adopted also in the case of three or more systems.

Next, an operation of the first embodiment will be described.

Figure 2:
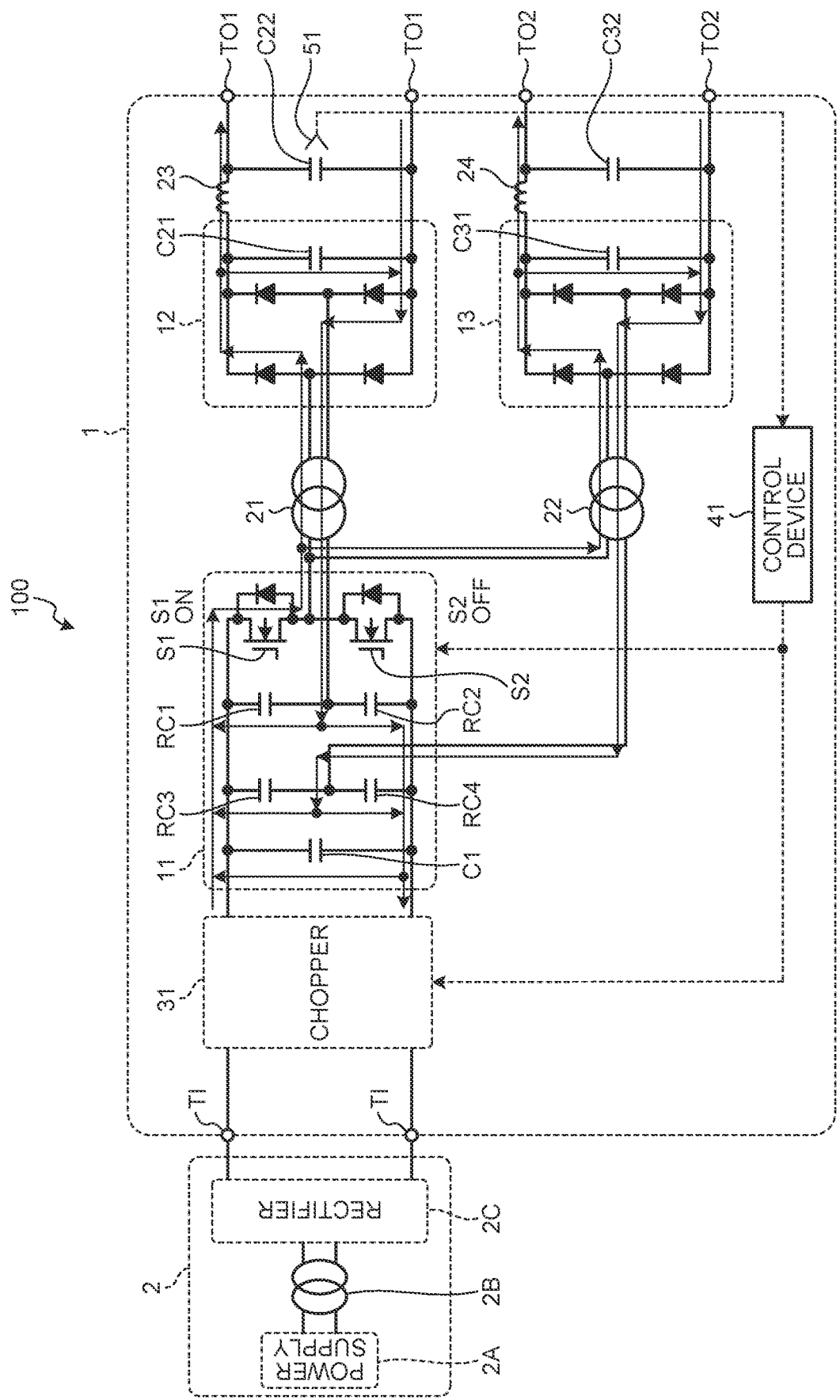
FIG. 2 is an explanatory diagram of a current path during an ON-period of an upper arm of a resonant inverter of the electric power conversion device according to the first embodiment.

FIG. 2 is an explanatory diagram of a current path during an ON-period of the upper arm of the resonant inverter of the electric power conversion device according to the first embodiment.

As illustrated in FIG. 2, the first resonant capacitor RC1, the second resonant capacitor RC2, the filter capacitor C1, the first switching transistor S1 (upper arm) of the resonant inverter 11, the first high-frequency transformer 21, and the first diode rectifier 12 form a resonance circuit.

At this time, the capacitance of the first resonant capacitor RC1 and the second resonant capacitor RC2, the leakage inductance of the first high-frequency transformer 21, and the conductor inductance of the current path are dominant as the circuit constant contributing to the resonance frequency of the resonance current flowing through the first high-frequency transformer 21.

Similarly, the third resonant capacitor RC3, the fourth resonant capacitor RC4, the filter capacitor C1, the first switching transistor S1 (upper arm) of the resonant inverter 11, the second high-frequency transformer 22, and the second diode rectifier 13 form a resonance circuit.

At this time, the capacitance of the third resonant capacitor RC3 and the fourth resonant capacitor RC4, the leakage inductance of the second high-frequency transformer 22, and the conductor inductance of the current path are dominant as the circuit constant contributing to the resonance frequency of the resonance current flowing through the second high-frequency transformer 22.

Figure 3:
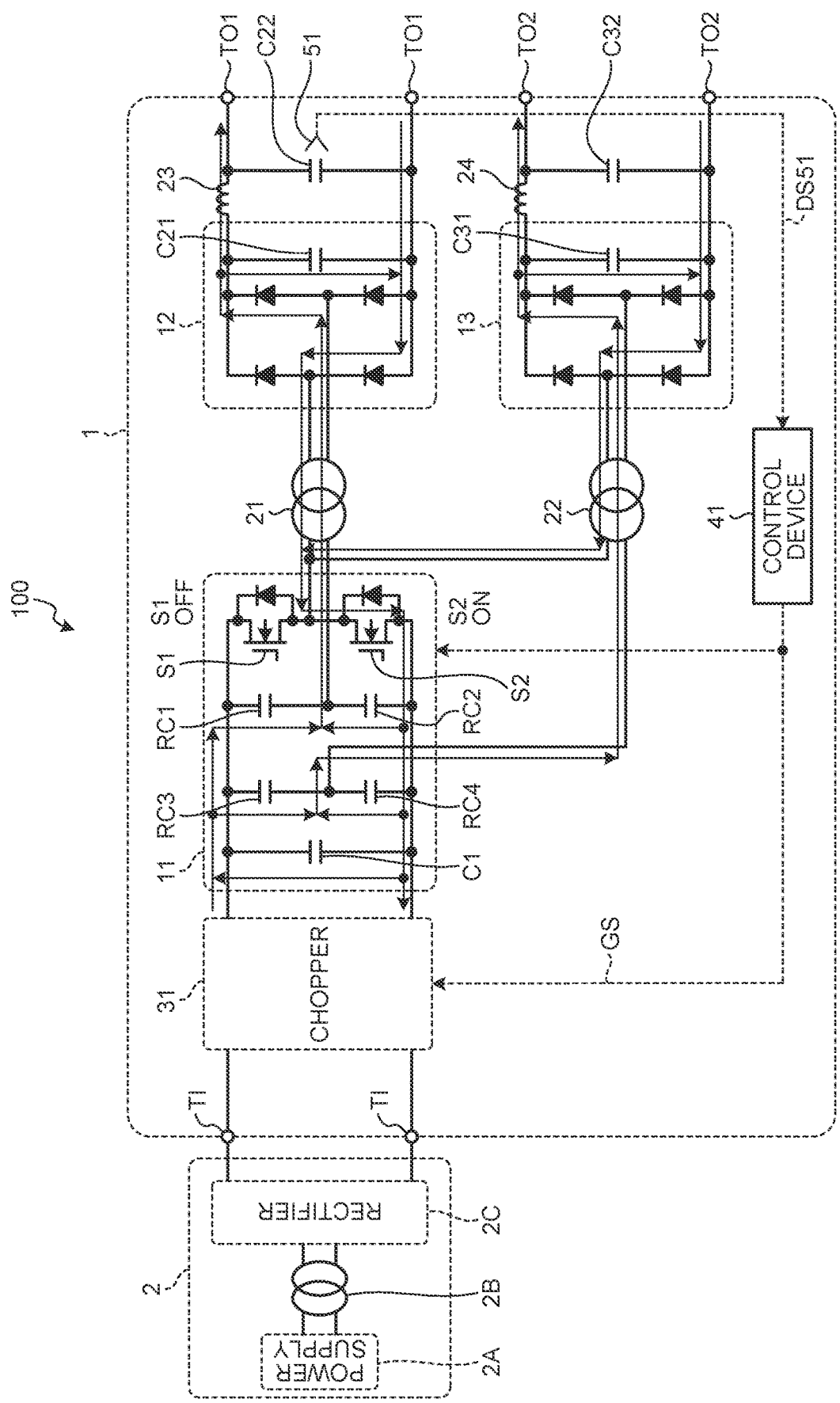
FIG. 3 is an explanatory diagram of a current path during an ON-period of a lower arm of the resonant inverter of the electric power conversion device according to the first embodiment.

FIG. 3 is an explanatory diagram of a current path during an ON-period of the lower arm of the resonant inverter of the electric power conversion device according to the first embodiment.

The first resonant capacitor RC1, the second resonant capacitor RC2, the filter capacitor C1, the second switching transistor S2 (lower arm) of the resonant inverter 11, the first high-frequency transformer 21, and the first diode rectifier 12 form a resonance circuit.

At this time, the capacitance of the first resonant capacitor RC1 and the second resonant capacitor RC2, the leakage inductance of the first high-frequency transformer 21, and the conductor inductance of the current path are dominant as the circuit constant contributing to the resonance frequency of the resonance current flowing through the first high-frequency transformer 21.

Similarly, the third resonant capacitor RC3, the fourth resonant capacitor RC4, the filter capacitor C1, the second switching transistor S2 (lower arm) of the resonant inverter 11, the second high-frequency transformer 22, and the second diode rectifier 13 form a resonance circuit.

At this time, the capacitance of the third resonant capacitor RC3 and the fourth resonant capacitor RC4, the leakage inductance of the second high-frequency transformer 22, and the conductor inductance of the current path are dominant as the circuit constant contributing to the resonance frequency of the resonance current flowing through the second high-frequency transformer 22.

As illustrated in FIGS. 2 and 3, the diode rectifiers 12 and 13 exist in the current paths. Therefore, when the polarity of the resonance current is inverted, the polarity is opposite to the diode polarity, and thus the resonance current does not flow when the resonance current reaches 0.

In addition, regarding the resonance current flowing through the first high-frequency transformer 21 and the resonance current flowing through the second high-frequency transformer 22, the current paths overlap only in the resonant inverter 11 and the filter capacitor C1 of the resonant inverter 11, whereas the resonant capacitor contributing to the resonance frequency and the high-frequency transformer are separated.

Therefore, the mutual interference of the resonance operation is negligible, and each conduction period of the resonance current can be regarded as constant.

Figure 4:
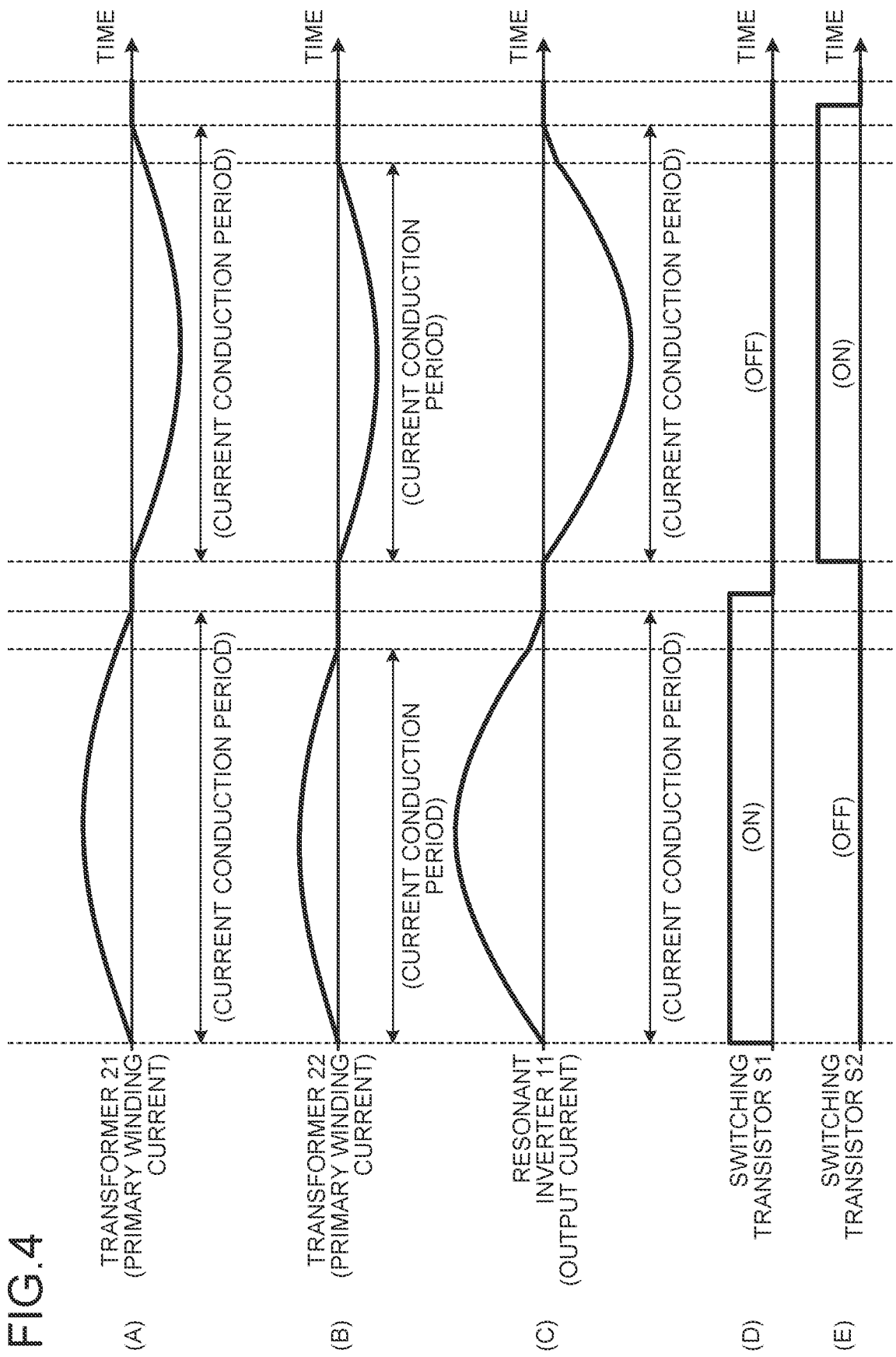
FIG. 4 is an explanatory diagram of current waveforms during the ON-period of the upper arm and the lower arm of the resonant inverter of the electric power conversion device according to the first embodiment.

FIG. 4 is an explanatory diagram of current waveforms during the ON-period of the upper arm and the lower arm of the resonant inverter of the electric power conversion device according to the first embodiment.

In the following description, the conduction period of the resonance current flowing through the primary winding of the first high-frequency transformer 21 is assumed to be longer than the conduction period of the resonance current flowing through the primary winding of the second high-frequency transformer 22.

The output current of the resonant inverter 11 is expressed by the sum of the resonance current flowing through the primary winding of the first high-frequency transformer 21 and the resonance current flowing through the primary winding of the second high-frequency transformer 22.

Accordingly, the conduction period of the output current of the resonant inverter 11 is determined by the resonance current having a longer conduction period, which flows through the primary winding of the first high-frequency transformer 21.

Therefore, when the ON-period of the first switching transistor S1 (upper arm) and the ON-period of the second switching transistor S2 (lower arm) of the resonant inverter 11 are made longer than the conduction periods of all the resonance currents flowing through the transformers, current interruption in the resonant inverter 11 does not occur.

In addition, the ON-period of the first switching transistor S1 (upper arm) and the ON-period of the second switching transistor S2 (lower arm) of the resonant inverter 11 are fixed to a value that is close to the conduction period of the resonance current.

As a result, the RMS value of the resonance current is reduced, and the loss of the circuit can be reduced.

Note that the ON-period of the resonant inverter 11 fixed cannot be used for control. Therefore, as described above, the chopper 31 controls the conduction ratio such that the output voltage of the output terminal TO1 comes to a predetermined voltage value.

Conventional chopper control will be described.

Figure 5:
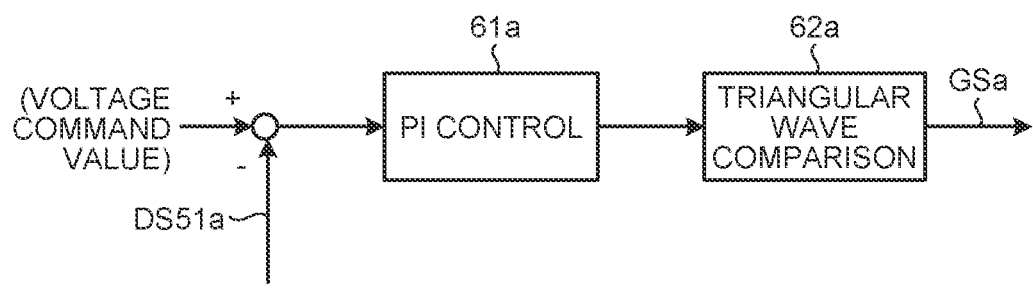
FIG. 5 is an explanatory diagram of control of a conventional chopper.

FIG. 5 is an explanatory diagram of control of a conventional chopper.

In the conventional chopper control performed by a control device 41a, the difference between a voltage command value and a value of a voltage detection signal DS51a output from a voltage detector 51a is input to a PI control unit 61a that performs proportional integral control, and the calculation result is input to a triangular wave comparison unit 62a, whereby a gate signal GSa of a chopper chopper is obtained.

By the way, in a case where the gain of the PI control unit cannot be increased due to performance restriction of the control device 41 or the like, the average voltage of the output terminal TO1 can be made constant, but the ripple voltage that periodically fluctuates cannot be suppressed, and there is a possibility that the ripple voltage exceeds the specification value of the voltage fluctuation.

Figure 6:
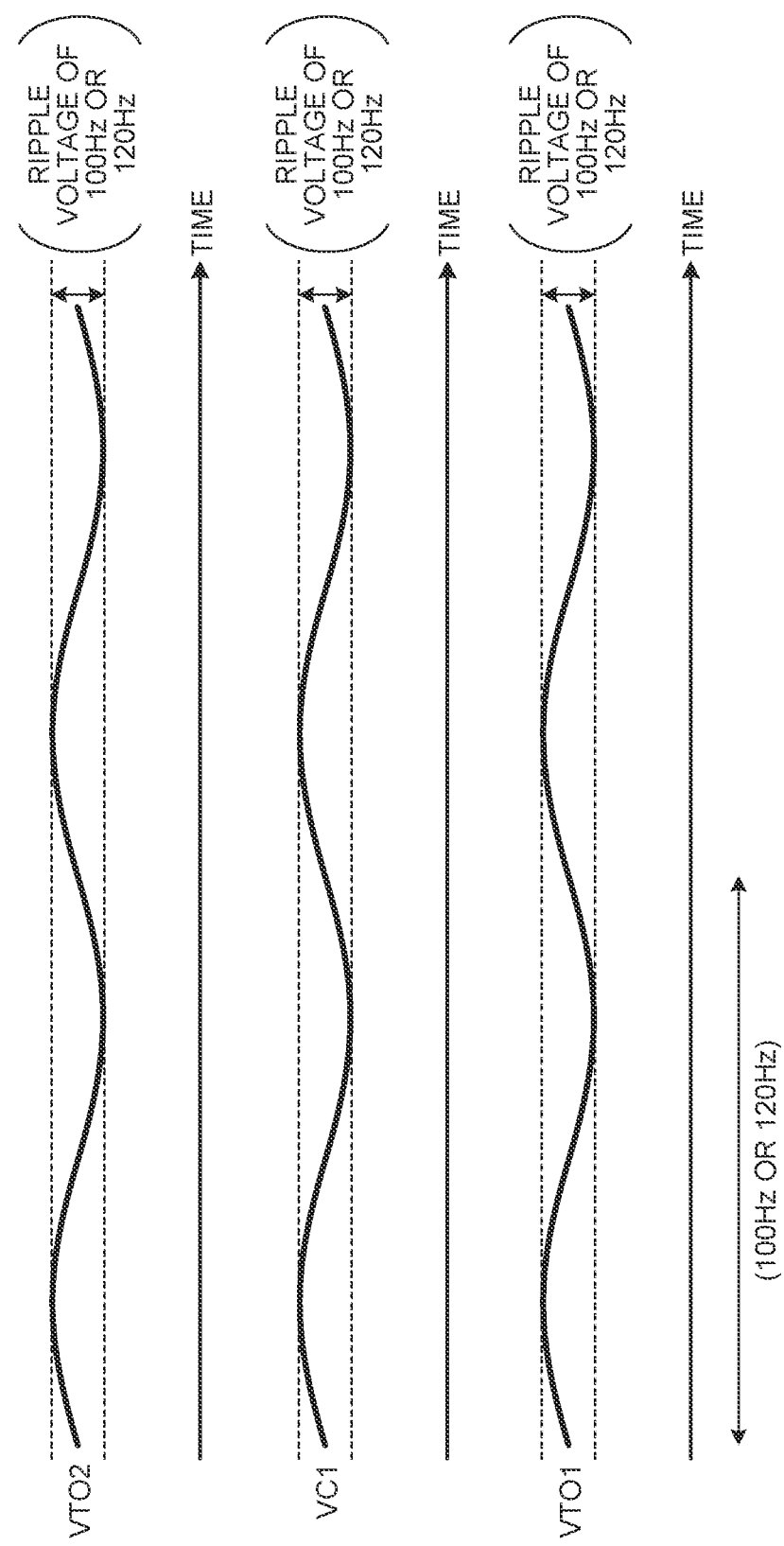
FIG. 6 is an explanatory diagram of voltage of each unit of the electric power conversion device according to the first embodiment.

FIG. 6 is an explanatory diagram of voltage of each unit of the electric power conversion device according to the first embodiment.

For example, in a case where a single-phase inverter is connected to the output terminal TO2 and a single-phase alternating-current voltage of 50 Hz or 60 Hz is output, power pulsation as illustrated in FIG. 6, which pulsates at 100 Hz or 120 Hz being twice the frequency of the output alternating-current voltage, occurs in the alternating-current power.

Due to the influence of this power pulsation, there is a possibility that a ripple voltage of 100 Hz or 120 Hz is also generated in an output voltage VTO2 of the output terminal TO2. In addition, the power pulsation also generates a ripple voltage in a voltage VC1 of the filter capacitor C1 of the resonant inverter 11, which is a power supply source. As a result, a ripple voltage is also generated in an output voltage VTO1 of the output terminal TO1.

Therefore, in the present first embodiment, the generation of the ripple voltage is suppressed.

Figure 7:
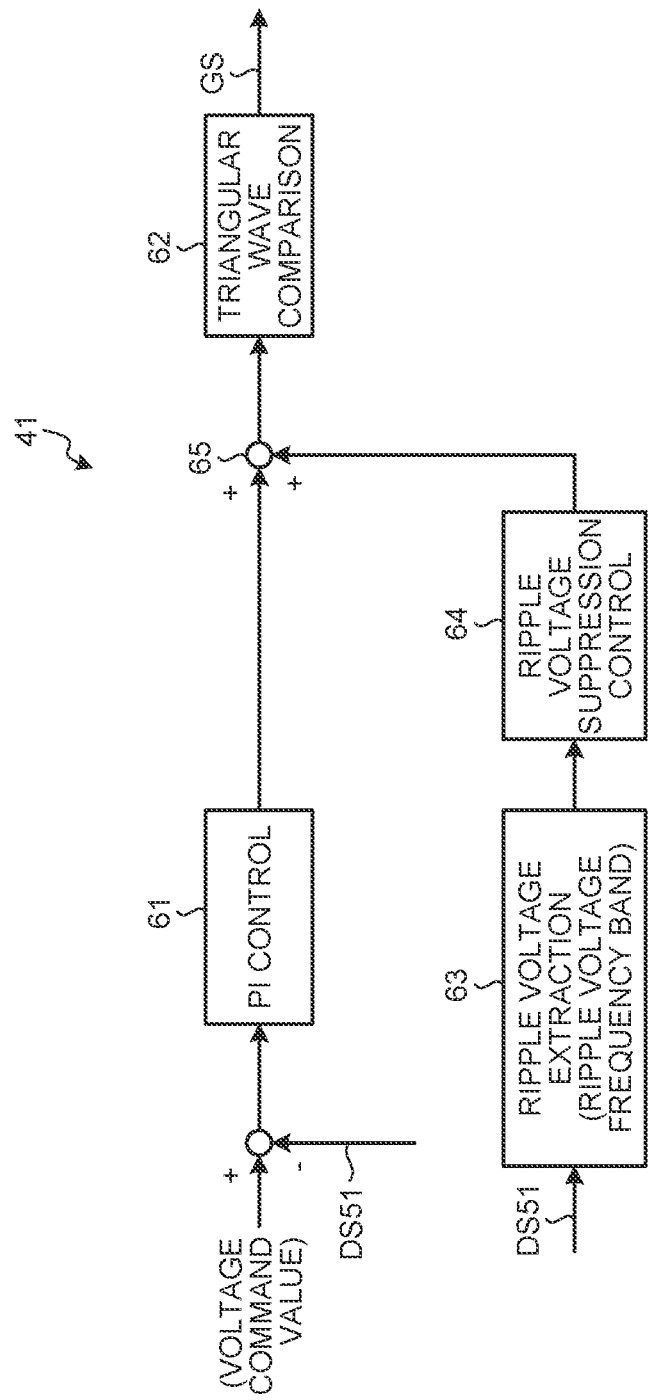
FIG. 7 is a diagram describing control of a chopper of the electric power conversion device according to the first embodiment for suppressing generation of ripple voltage.

FIG. 7 is a diagram describing control of the chopper of the electric power conversion device according to the first embodiment for suppressing generation of ripple voltage.

A ripple voltage extraction unit 63 extracts a ripple voltage in a specific ripple voltage frequency band, which is included in the voltage detection signal DS51 corresponding to the voltage of the output terminal TO1 detected by the voltage detector 51.

In this case, examples of a method of extracting the ripple voltage include use of a band pass filter, FFT, or the like.

Then, a ripple voltage suppression control unit 64 receives the extracted ripple voltage value as input, calculates the output value of the ripple voltage frequency band so as to reduce the ripple voltage, outputs the output value to an adder 65, and adds the output value to the output value of the PI control 61.

As a result, the effective voltage command value input to the triangular wave comparison unit 62 suppresses the influence of the ripple voltage.

Accordingly, in the present first embodiment, the gate signal GS of the chopper 31 output from the triangular wave comparison unit 62 suppresses the generation of the ripple voltage due to the power pulsation.

As described above, according to the present first embodiment, it is possible to perform electric power conversion while suppressing the ripple voltage of the voltage VTO2 of the output terminal TO2, the voltage VC1 of the filter capacitor C1, and the output voltage VTO1 of the output terminal TO1.

(2) Second Embodiment

Next, a second embodiment will be described.

Figure 8:
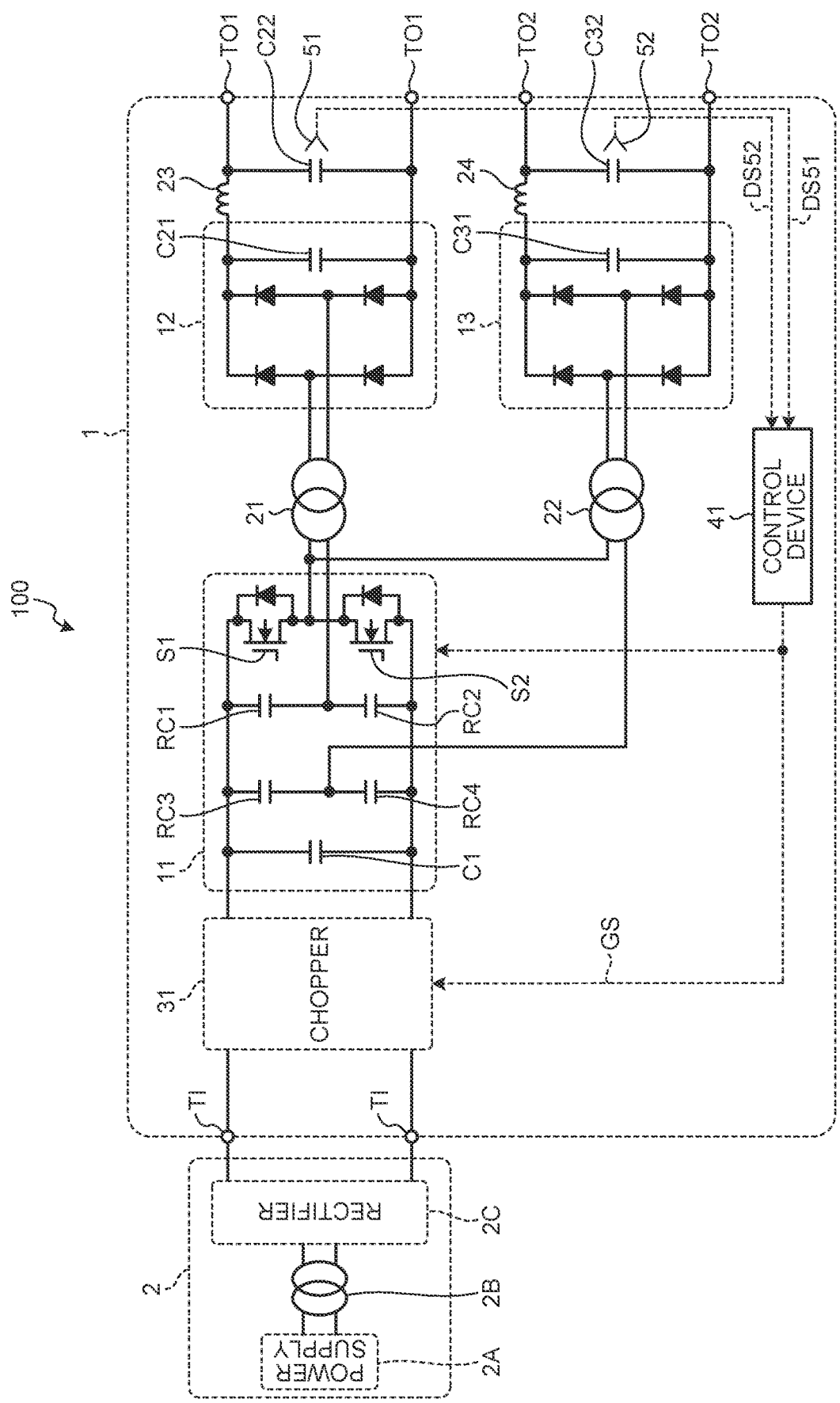
FIG. 8 is a schematic configuration explanatory diagram of an electric power conversion device according to a second embodiment.

FIG. 8 is a schematic configuration explanatory diagram of an electric power conversion device according to the second embodiment.

In FIG. 8, the same reference signs are given to parts similar to those of the first embodiment of FIG. 1.

The present second embodiment is different from the first embodiment in that, a voltage detector 52 that detects a voltage VTO2 of an output terminal TO2 and outputs a voltage detection signal DS52 is provided.

Figure 9:
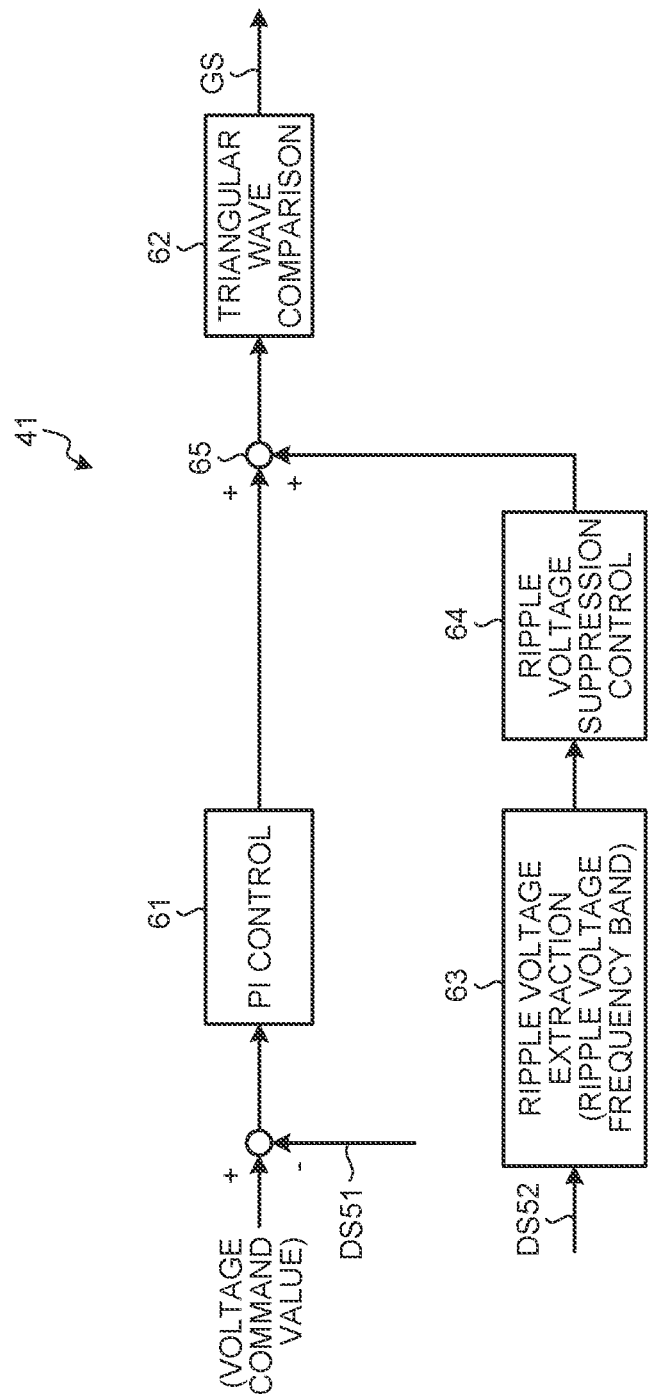
FIG. 9 is an explanatory diagram of chopper control of the electric power conversion device according to the second embodiment.

FIG. 9 is an explanatory diagram of chopper control of the electric power conversion device according to the second embodiment.

In the first embodiment, as described with reference to FIG. 6, there is a possibility that a ripple voltage is also generated at the output terminal TO2. Therefore, in the present second embodiment, the voltage detection signal DS52 output from the voltage detector 52 is used as an input value of a ripple voltage extraction unit 63.

The ripple voltage extraction unit 63 extracts a ripple voltage in a specific ripple voltage frequency band included in the voltage detection signal DS52 corresponding to an output voltage VTO2 of the output terminal TO2 detected by the voltage detector 52.

Then, a ripple voltage suppression control unit 64 receives the extracted ripple voltage value as input, calculates the output value of the ripple voltage frequency band so as to reduce the ripple voltage, outputs the output value to an adder 65, and adds the output value to the output value of the PI control 61.

As a result, the effective voltage command value input to a triangular wave comparison unit 62 suppresses the influence of the ripple voltage appearing at the second output terminal TO2.

Accordingly, according to the present second embodiment, in addition to the effects of the first embodiment, a gate signal GS of a chopper 31 output from the triangular wave comparison unit 62 can more unfailingly suppress the influence of the ripple voltage appearing in the output voltage VTO2 of the second output terminal TO2.

(3) Third Embodiment

Next, a third embodiment will be described.

Figure 10:
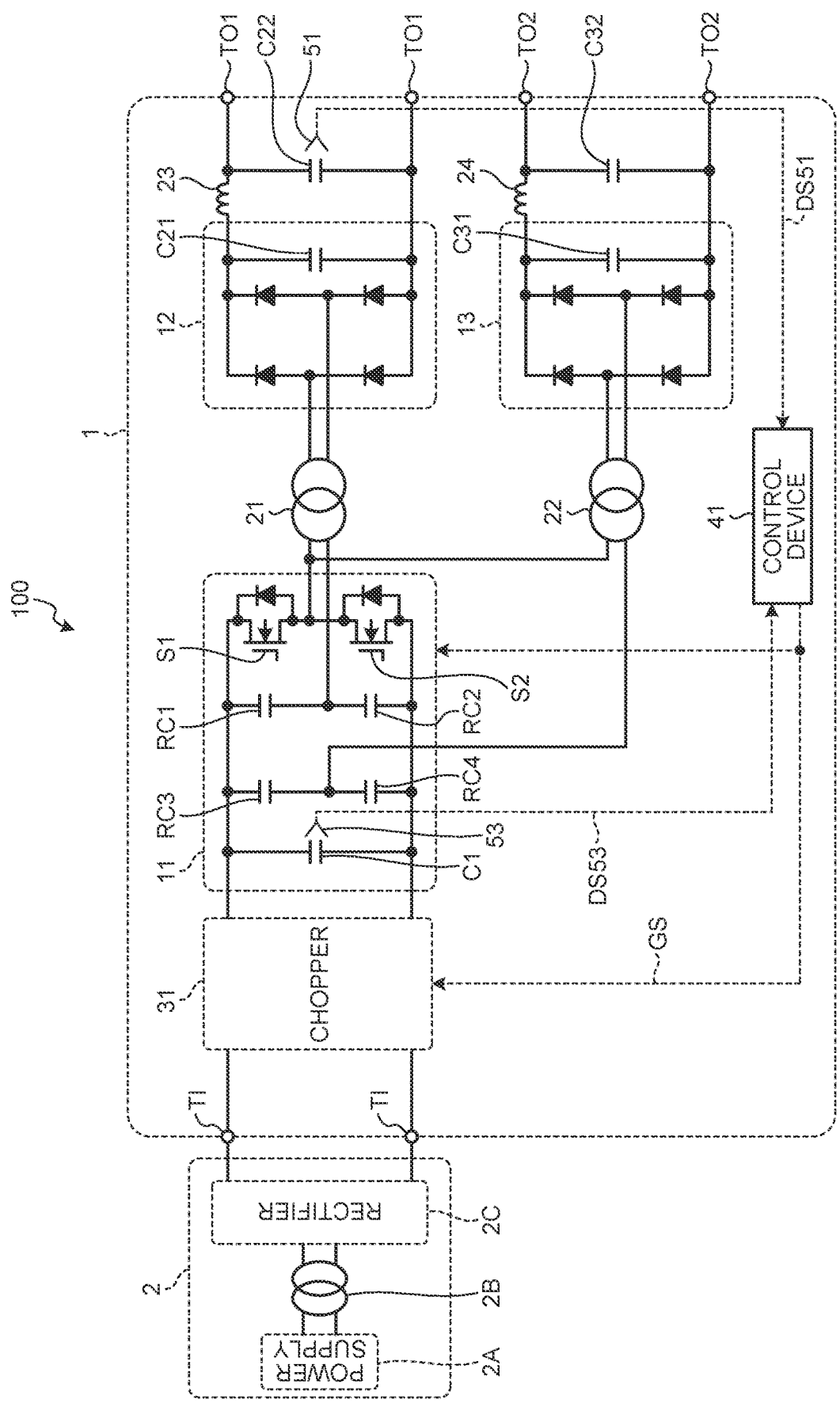
FIG. 10 is a schematic configuration explanatory diagram of an electric power conversion device according to a third embodiment.

FIG. 10 is a schematic configuration explanatory diagram of an electric power conversion device according to the third embodiment.

In FIG. 10, the same reference signs are given to parts similar to those of the first embodiment of FIG. 1.

The present third embodiment is different from the first embodiment in that, a voltage detector 53 that detects a voltage of a filter capacitor C1 of a resonant inverter 11 and outputs a voltage detection signal DS53 is added.

Figure 11:
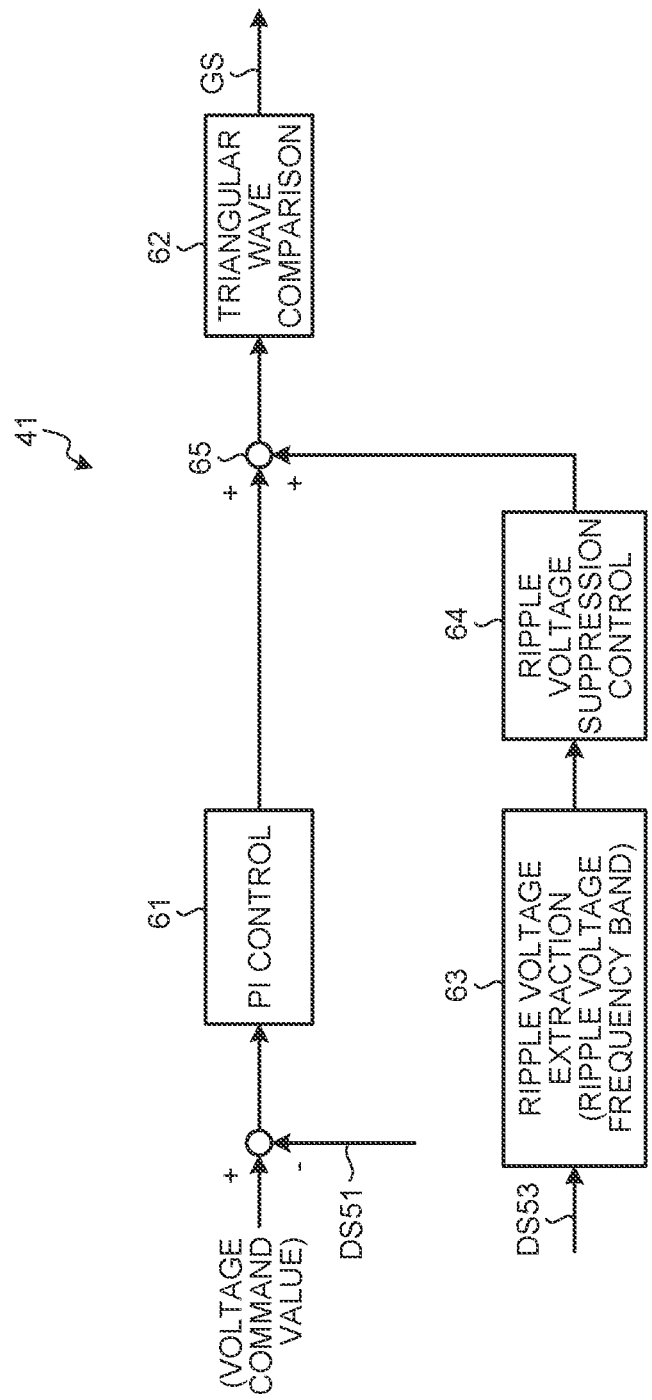
FIG. 11 is an explanatory diagram of chopper control of the electric power conversion device according to the third embodiment.

FIG. 11 is an explanatory diagram of chopper control of the electric power conversion device according to the third embodiment.

In the first embodiment, as described with reference to FIG. 6, there is a possibility that a ripple voltage is also generated in the filter capacitor C1 of the resonant inverter 11.

Therefore, in the present third embodiment, the voltage detection signal DS53 output from the voltage detector 53 is used as an input value of a ripple voltage extraction unit 63.

The ripple voltage extraction unit 63 extracts a ripple voltage in a specific ripple voltage frequency band included in the voltage detection signal DS53 corresponding to an output voltage VC1 of the filter capacitor C1 of the resonant inverter 11 detected by the voltage detector 53.

Then, a ripple voltage suppression control unit 64 receives the extracted ripple voltage value as input, calculates the output value of the ripple voltage frequency band so as to reduce the ripple voltage, outputs the output value to an adder 65, and adds the output value to the output value of the PI control 61.

As a result, the effective voltage command value input to a triangular wave comparison unit 62 suppresses the influence of the ripple voltage appearing in the output voltage VC1 of the filter capacitor C1 of the resonant inverter 11.

Accordingly, according to the present third embodiment, in addition to the effects of the first embodiment, a gate signal GS of a chopper 31 output from the triangular wave comparison unit 62 can more unfailingly suppress the influence of the ripple voltage appearing in the output voltage VC1 of the filter capacitor C1 of the resonant inverter 11.

(4) Fourth Embodiment

Figure 12:
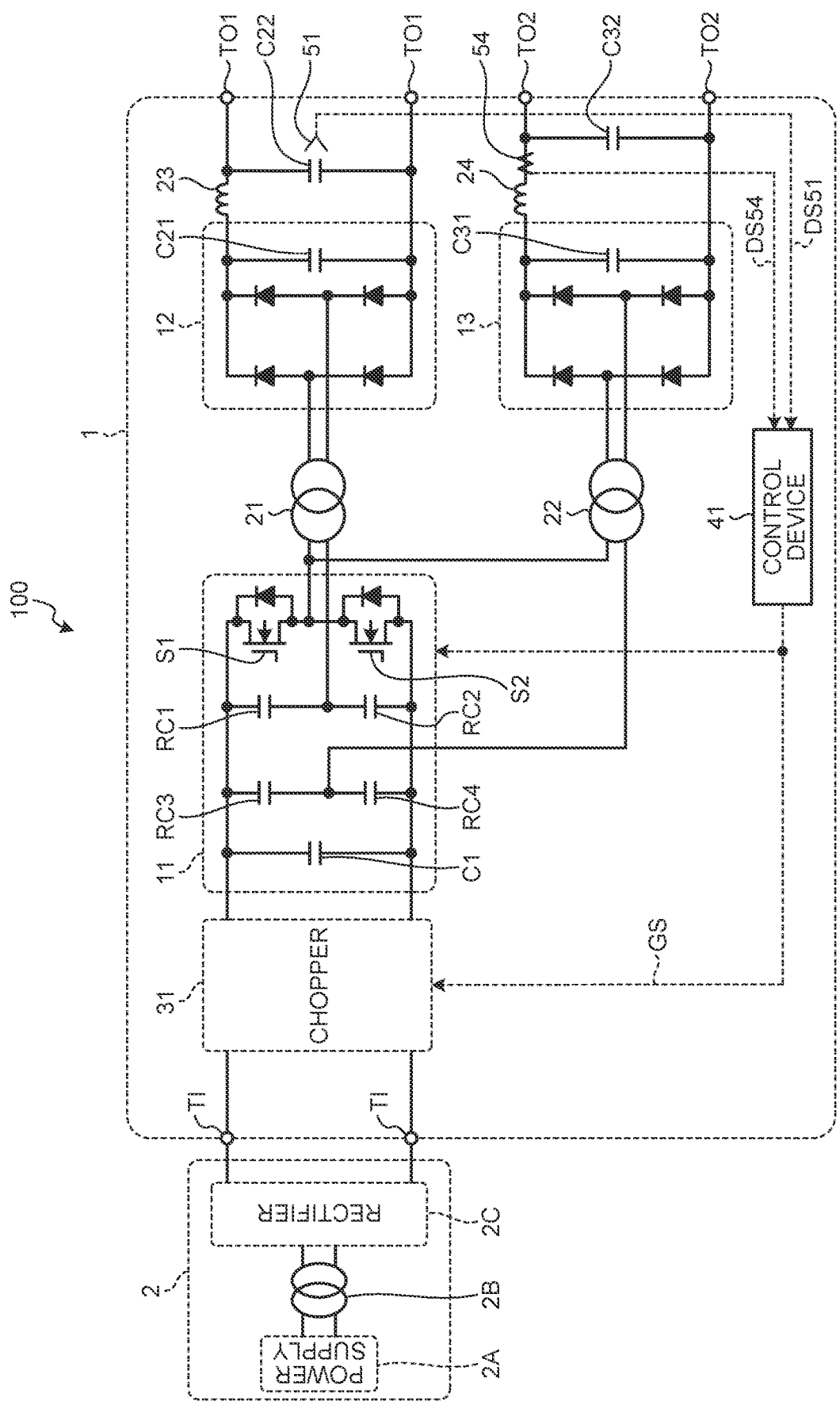
FIG. 12 is an explanatory diagram of chopper control of an electric power conversion device according to a fourth embodiment.

FIG. 12 is an explanatory diagram of chopper control of an electric power conversion device according to the fourth embodiment.

FIG. 12 is a schematic configuration explanatory diagram of the electric power conversion device according to the fourth embodiment.

In FIG. 12, the same reference signs are given to parts similar to those of the first embodiment of FIG. 1.

The present fourth embodiment is different from the first embodiment in that, a current detector 54 that detects a current of a second reactor 24 and outputs a current detection signal DS54 is added.

Figure 13:
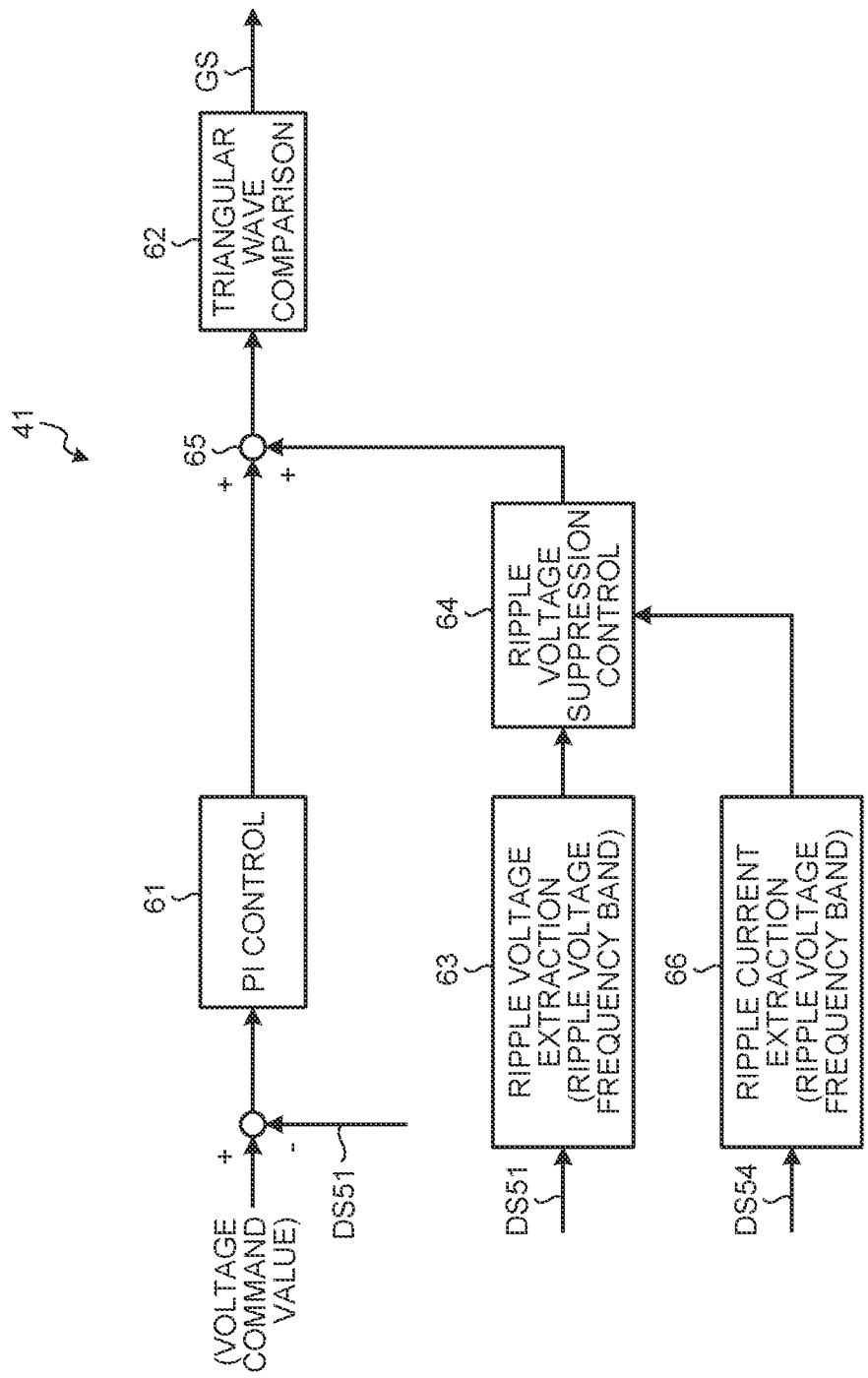
FIG. 13 is an explanatory diagram of control of a chopper of the electric power conversion device according to the fourth embodiment.

FIG. 13 is an explanatory diagram of control of a chopper of the electric power conversion device according to the fourth embodiment.

By the way, similarly to the ripple voltage, a ripple current is also generated in the current of the reactor 24, and the ripple current is larger than a ripple voltage in terms of the ratio with respect to the direct current value. In addition, even when the ripple voltage is reduced, a ripple current is generated due to power pulsation.

Therefore, in the present fourth embodiment, a ripple voltage extraction unit 63 extracts a ripple voltage in a specific ripple voltage frequency band included in a voltage detection signal DS51 corresponding to the voltage of an output terminal TO1 detected by a voltage detector 51 as a first input value for a ripple voltage suppression control 64.

Moreover, based on the current detection signal DS54 output from the current detector 54, the ripple current is extracted by a ripple current extraction unit 66 as a second input value for the ripple voltage suppression control 64.

With these configurations, the ripple voltage suppression control unit 64 calculates the output value of the ripple voltage frequency band so as to reduce the ripple voltage by using the extracted ripple voltage value as the first input and the extracted ripple current value as the second input. Then, the ripple voltage suppression control unit 64 outputs the output value to an adder 65 to add the output value to the output value of a PI control 61.

As a result, the effective voltage command value input to a triangular wave comparison unit 62 can suppress the influence of the ripple voltage appearing in a voltage VTO2 of an output terminal TO2, a voltage VC1 of a filter capacitor C1, and an output voltage VTO1 of an output terminal TO1 with high accuracy by also considering the ripple current.

Therefore, according to the present fourth embodiment, in addition to the effects of the first embodiment, a gate signal GS of a chopper 31 output from the triangular wave comparison unit 62 is obtained by taking into consideration the influence of the ripple current and can more unfailingly suppress the generation of the ripple voltage.

While the embodiments of the present invention have been described above, the embodiments are presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the scope of equivalents thereof.

For example, the embodiments includes a control method of an electric power conversion device executed by the electric power conversion device, the electric power conversion device including a chopper converting electric power from a power supply into direct-current power and output the direct-current power, an inverter converting convert the direct-current power output from the chopper into alternating-current power, pairs of resonant capacitors connected to a direct-current input section of the inverter, each of the pairs being in series, high-frequency transformers whose primary windings are connected to the inverter and respective midpoints of the pairs of resonant capacitors, the high-frequency transformers converting the alternating-current power of the inverter, and rectifiers converting alternating-current power supplied from secondary windings of the high-frequency transformers into direct-current power, the control method comprising a step of detecting an output voltage of one of the rectifiers; and a step of controlling the chopper on the basis of a result of the detection of the output voltage such that an output voltage of the direct-current power comes to a predetermined voltage value.

In addition, the embodiments include a program for controlling, with a computer, an electric power conversion device, the electric power conversion device including a chopper converting electric power from a power supply into direct-current power and output the direct-current power, an inverter converting convert the direct-current power output from the chopper into alternating-current power, pairs of resonant capacitors connected to a direct-current input section of the inverter, each of the pairs being in series, high-frequency transformers whose primary windings are connected to the inverter and respective midpoints of the pairs of resonant capacitors, the high-frequency transformers converting the alternating-current power of the inverter, and rectifiers converting alternating-current power supplied from secondary windings of the high-frequency transformers into direct-current power, the program causing the computer to function as means for detecting an output voltage of one of the rectifiers; and means for controlling the chopper on the basis of a result of the detection of the output voltage such that an output voltage of the direct-current power comes to a predetermined voltage value.

The invention claimed is:

1. An electric power conversion device comprising:
   a chopper configured to convert electric power from a power supply into direct current power and output the direct-current power;
   an inverter configured to convert the direct-current power output from the chopper into alternating-current power;
   pairs of resonant capacitors connected to a direct-current input section of the inverter, each of the pairs being in series;
   high-frequency transformers whose primary windings are connected to the inverter and respective midpoints of the pairs of resonant capacitors, the high frequency transformers being configured to convert the alternating-current power of the inverter;
   rectifiers configured to convert alternating-current power supplied from secondary windings of the high-frequency transformers into direct-current power;
   one or more voltage detectors configured to detect output voltage of one or more of the rectifiers; and
   a control device configured to control the chopper on the basis of output of the one or more voltage detectors such that an output voltage of the direct-current power comes to a predetermined voltage value.

2. The electric power conversion device according to claim 1, wherein a time period during which a switch constituting the inverter is turned on is set to a fixed value longer than a conduction period of a resonance current flowing through the primary windings of the high-frequency transformers.

3. The electric power conversion device according to claim 1, wherein the control device is configured to
   extract a ripple voltage in a specific frequency band on the basis of a detection value of the voltage detector, and
   control the chopper to reduce the ripple voltage included in the output voltage of the direct-current power.

4. The electric power conversion device according to claim 1, comprising voltage detectors configured to detect output voltages of two or more of the rectifiers,
   wherein the control device is configured to
      extract ripple voltages in a specific frequency band on the basis of detection values of the voltage detectors, and
      control the chopper to reduce the ripple voltage included in the output voltage of the direct-current power.

5. The electric power conversion device according to claim 1, further comprising a current detector configured to detect a ripple current included in an output current of the direct-current power,
   wherein the control device is configured to
      extract a ripple current in a specific frequency band on the basis of a ripple current detected by the current detector, and
      control the chopper to reduce the ripple voltage included in the output voltage of the direct-current power.

6. A control method of an electric power conversion device executed by the electric power conversion device, the electric power conversion device including a chopper converting electric power from a power supply into direct-current power and output the direct-current power, an inverter converting the direct-current power output from the chopper into alternating-current power, pairs of resonant capacitors connected to a direct-current input section of the inverter, each of the pairs being in series, high-frequency transformers whose primary windings are connected to the inverter and respective midpoints of the pairs of resonant capacitors, the high-frequency transformers converting the alternating current power of the inverter, and rectifiers converting alternating-current power supplied from secondary windings of the high-frequency transformers into direct current power, the control method comprising:
   detecting output voltage of one or more of the rectifiers; and
   controlling the chopper on the basis of a result of the detection of the output voltage such that an output voltage of the direct-current power comes to a predetermined voltage value.

7. The electric power conversion device according to claim 3, further comprising a current detector configured to detect a ripple current included in an output current of the direct-current power,
   wherein the control device is configured to
      extract a ripple current in a specific frequency band on the basis of a ripple current detected by the current detector, and
      control the chopper to reduce the ripple voltage included in the output voltage of the direct-current power.

* * * * *